(12) United States Patent
Fathollahi

(10) Patent No.: US 10,848,194 B2
(45) Date of Patent: *Nov. 24, 2020

(54) PROTECTIVE CASES FOR MOBILE DEVICES

(71) Applicant: Incipio Technologies, Inc., Irvine, CA (US)

(72) Inventor: Andy Fathollahi, Corona Del Mar, CA (US)

(73) Assignee: Incipio, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/292,497

(22) Filed: May 30, 2014

(65) Prior Publication Data

US 2014/0265767 A1 Sep. 18, 2014

Related U.S. Application Data

(63) Continuation of application No. 12/540,316, filed on Aug. 12, 2009, now Pat. No. 8,800,762.

(51) Int. Cl.
*H04B 1/3888* (2015.01)
*A45C 11/00* (2006.01)

(52) U.S. Cl.
CPC ...... *H04B 1/3888* (2013.01); *A45C 2011/001* (2013.01); *A45C 2011/002* (2013.01); *A45C 2011/003* (2013.01); *Y10T 29/49826* (2015.01)

(58) Field of Classification Search
CPC ............. G06F 1/1628; A45C 2013/025; A45C 2011/002; A45C 2011/003; A45C 2011/001; H04C 1/3888
USPC ..... 206/320, 576, 724, 701, 349; 455/575.1, 455/575.8; 361/679.01, 679.02
See application file for complete search history.

(56) References Cited

U.S. PATENT DOCUMENTS

| | | |
|---|---|---|
| D107,221 S | 11/1937 | Dewsbury |
| 2,967,714 A | 1/1961 | Calabrese |
| 3,192,978 A | 7/1965 | William-Horvath |
| D287,905 S | 1/1987 | Oyamada |
| D317,255 S | 6/1991 | Turk |
| D320,992 S | 10/1991 | Jondelius |
| D339,690 S | 9/1993 | Takahashi et al. |
| D346,275 S | 4/1994 | Hayasaka et al. |
| D371,137 S | 6/1996 | Kriegh |
| D387,199 S | 12/1997 | Nagele et al. |

(Continued)

FOREIGN PATENT DOCUMENTS

DM 058570 11/2001

OTHER PUBLICATIONS

Horowitz, Jeremy, "iSkin Claro Silicone/Clear Case Combination for iPod with video," Jul. 5, 2006, http://www.ilounge.com/index.php/reviews/entry/ikin-claro-silicone-clear-case-combination-for-ipod-with-video/.

(Continued)

*Primary Examiner* — Rafael A Ortiz

(57) ABSTRACT

The disclosure relates to a method and apparatus for protecting a mobile device. In one embodiment, a protection device for a mobile device is disclosed which induces a combination of a flexible inner sleeve and a rigid shell. The flexible inner sleeve conforms to, and encapsulates, the mobile device. The rigid shell receives and engages the inner sleeve. The flexible inner sleeve and the rigid shell can be used separately with the mobile device or can encase the mobile device as an integrated protective unit.

10 Claims, 14 Drawing Sheets

(56) References Cited

U.S. PATENT DOCUMENTS

| | | | |
|---|---|---|---|
| D389,641 S | 1/1998 | McCutcheon et al. | |
| D392,097 S | 3/1998 | Pottala et al. | |
| 5,755,367 A | 5/1998 | Yamada | |
| D400,209 S | 10/1998 | Williams et al. | |
| D400,497 S | 11/1998 | Sabag et al. | |
| D406,191 S | 3/1999 | Phillips et al. | |
| D419,290 S | 1/2000 | Treyer et al. | |
| D434,898 S | 12/2000 | Jokinen et al. | |
| 6,239,968 B1 | 5/2001 | Kim et al. | |
| 6,273,252 B1 | 8/2001 | Mitchell | |
| D462,514 S | 9/2002 | Rivera et al. | |
| 6,445,577 B1 | 9/2002 | Madsen et al. | |
| 6,456,487 B1* | 9/2002 | Hetterick | 361/679.3 |
| 6,471,056 B1 | 10/2002 | Tzeng | |
| D466,287 S | 12/2002 | Tanaka | |
| 6,519,141 B2 | 2/2003 | Chang | |
| 6,536,589 B2 | 3/2003 | Chang | |
| 6,646,864 B2 | 11/2003 | Richardson | |
| D495,871 S | 9/2004 | Moffitt et al. | |
| D499,546 S | 12/2004 | Smithers | |
| 6,995,976 B2 | 2/2006 | Richardson | |
| D516,554 S | 3/2006 | Richardson et al. | |
| D521,232 S | 5/2006 | Andre et al. | |
| D526,780 S | 8/2006 | Richardson et al. | |
| D529,713 S | 10/2006 | Guyot et al. | |
| D530,079 S | 10/2006 | Thomas et al. | |
| 7,158,376 B2 | 1/2007 | Richardson et al. | |
| 7,180,735 B2 | 2/2007 | Thomas et al. | |
| D541,296 S | 4/2007 | Kim | |
| D542,524 S | 5/2007 | Richardson et al. | |
| D543,541 S | 5/2007 | Chung et al. | |
| 7,230,823 B2 | 6/2007 | Richardson et al. | |
| 7,261,204 B2 | 8/2007 | Zaidi et al. | |
| D553,352 S | 10/2007 | Allen | |
| D553,357 S | 10/2007 | Zimmerman | |
| 7,312,984 B2 | 12/2007 | Richardson et al. | |
| D561,724 S | 2/2008 | Kim et al. | |
| D565,290 S | 4/2008 | Brandenburg et al. | |
| D570,593 S | 6/2008 | Justiss | |
| D575,056 S | 8/2008 | Tan | |
| D581,151 S | 11/2008 | Aipa | |
| D581,155 S | 11/2008 | Richardson et al. | |
| D581,421 S | 11/2008 | Richardson et al. | |
| D587,008 S | 2/2009 | Richardson et al. | |
| D589,016 S | 3/2009 | Richardson et al. | |
| D593,319 S | 6/2009 | Richardson et al. | |
| D593,746 S | 6/2009 | Richardson et al. | |
| D593,750 S * | 6/2009 | Song | D3/269 |
| D597,089 S | 7/2009 | Khan et al. | |
| D597,301 S | 8/2009 | Richardson et al. | |
| D598,407 S | 8/2009 | Richardson et al. | |
| D600,908 S | 9/2009 | Richardson et al. | |
| 7,594,576 B2 | 9/2009 | Chen et al. | |
| 7,609,512 B2 | 10/2009 | Richardson et al. | |
| D603,602 S | 11/2009 | Richardson et al. | |
| D603,603 S | 11/2009 | Leine et al. | |
| D605,850 S | 12/2009 | Richardson et al. | |
| D606,529 S | 12/2009 | Ferrari et al. | |
| D607,446 S | 1/2010 | Ferrari et al. | |
| D609,463 S | 2/2010 | Bullen | |
| D609,464 S | 2/2010 | Bullen | |
| 7,663,879 B2 | 2/2010 | Richardson et al. | |
| D610,807 S | 3/2010 | Bau | |
| D611,042 S | 3/2010 | Ferrari et al. | |
| D611,478 S | 3/2010 | Richardson et al. | |
| 7,688,580 B2 | 3/2010 | Richardson et al. | |
| D615,536 S | 5/2010 | Richardson et al. | |
| D616,361 S | 5/2010 | Huang | |
| D619,573 S * | 7/2010 | Khan et al. | D14/250 |
| 2003/0151890 A1 | 8/2003 | Huang et al. | |
| 2004/0057199 A1 | 3/2004 | Azuchi | |
| 2005/0247584 A1 | 11/2005 | Lu | |
| 2006/0052064 A1 | 3/2006 | Goradesky | |
| 2006/0231713 A1 | 10/2006 | Crain et al. | |
| 2007/0165367 A1 | 7/2007 | Chung | |
| 2008/0316687 A1* | 12/2008 | Richardson et al. | 361/680 |
| 2009/0009945 A1 | 1/2009 | Johnson et al. | |
| 2009/0034169 A1 | 2/2009 | Richardson et al. | |
| 2009/0080153 A1 | 3/2009 | Richardson et al. | |
| 2009/0111543 A1 | 4/2009 | Tai et al. | |
| 2009/0113758 A1 | 5/2009 | Nishiwaki et al. | |
| 2009/0154095 A1 | 6/2009 | Would | |
| 2010/0008028 A1 | 1/2010 | Richardson et al. | |
| 2010/0096284 A1* | 4/2010 | Bau | 206/320 |
| 2010/0203931 A1* | 8/2010 | Hynecek et al. | 455/575.8 |

OTHER PUBLICATIONS

Horowitz, Jeremy, "Incipio dermaSHOT Silicone Case for Apple iPhone," Jul. 6, 2007, http://www.ilounge.com/index.php/reviews/entry/incipio-dermashot-silicone-case-for-apple-iphone/.

Horowitz, Jeremy, "Incipio Silicrylic Case for iPhone," Jul. 31, 2007, http://www.ilounge.com/index.php/reviews/entry/incipio-silicrylic-case-for-iphone/.

Horowitz, Jeremy, "Incipio Silicrylic for iPhone 3G," Aug. 7, 2008, http://www.ilounge.com/index.php/reviews/entry/incipio-silicrylic-case-for-iphone-3g/.

Horowitz, Jeremy, "Incipio Silicrylic for iPod touch 2G," Jan. 2, 2009, http://www.ilounge.com/index.php/reviews/entry/incipio-silicrylic-for-ipod-touch-2g/.

BlackBerry Storm Computer Series Case, URL:http://www.otterbox.com/blackberry-storm-commuter-case/> Mar. 24, 2010.

Incipio Holster for Motorola RAZR, URL:http://www.myincipio.com/products/RAZR_HOLSTER_ID-279/Incipio-Ultra_Lightweight-Motorola-V3, v3M-v3i-v3c-RAZR-Magnesium-Play-Thru-Holster-Belt-Carrying-Case-Pink.html, Mar. 24, 2010.

Black dotties™ Silicone Case for apple iPhone 3G, 3GS, <URL:http://www.myincipio.com/productiPhone_3G-IPH-450, retrieved from internet May 9, 2010.

The OtterBox Commuter Series 3GS for iPhone, <URL:http://www.otterbox.com/iphone-cases/iphone-3g-3gs-cases, retrieved from internet May 9, 2010.

Seido FlexArmor, <URL:http://www.seidioonline.com/PhotoGallery.asp?, retrieved from internet May 9, 2010.

SILICRYLIC Polycarbonate Case with Silicone Core for iPhone 3G, 3GS—Olive Green, <URL:http://www.myincipio.com/product/IPHONE_3G_IPH-617, retrieved from internet May 29, 2010.

Incipio Silicrylic for iPhone 3G, on sale more than one year prior to filed, product as shown on Amazon.com product page, http://www.amazon.com/Incipio-SILICRYLIC-Case-iPhone-Clear/dp/B001AV8OD8, retrieved on Oct. 29, 2012.

Five photographs of INCIPIO® SILICRYLIC® Case and Gel, believed to be on sale more than one year before the filing date of this application.

\* cited by examiner

PROTECTIVE CASES FOR MOBILE DEVICES

INCORPORATION BY REFERENCE TO RELATED APPLICATIONS

The present application is a continuation of U.S. patent application Ser. No. 12/540,316, filed Aug. 12, 2009. The above application is hereby incorporated herein by reference in its entirety and is to be considered a part of this specification.

BACKGROUND

Field of the Invention

The disclosure generally relates to an apparatus for protecting a mobile device. More specifically, the disclosure relates to protection cases which enable quick and unobstructed access to the features of the mobile device while protecting the mobile device from accidental damage.

Description of Related Art

Computers, mobile devices (e.g., telephones, BlackBerrys®, and iPhones®), and personal digital assistant ("PDA") are being made progressively smaller. New mobile devices include smart telephones which also function as small computers. Such mobile devices are often equipped with music playback and camera/camcorder features. More advanced mobile devices include a touch screen pad on the mobile device's display area. The touch pad provides a full keyboard function in a region of the display area. As compared to mobile phones having alpha-numeral key pads, the mobile devices featuring a touch screen with full functioning keypads allow the subscriber to access many more applications. Such applications typically include full internet access and email.

As with any mobile device, there is a risk of accidental dropping and damage to the underlying mobile device. Conventional methods for protecting similar portable devices include encasing the entire device in a hard protective shell case. Hard protective shell cases typically are made of a thermoplastic resin which is molded to house the handheld mobile device. Hard shell cases provide excellent protection. However, because of their rigidity, hard shell cases are brittle and subject to shattering when dropped. Hard shell cases can also be abrasive to the touch.

On the other hand, soft protective shell cases are typically formed from polymeric material, fabric or leather, and are configured to house the mobile device. Soft protective shell cases provide marginal exterior protection but are soft to the touch. However, soft protective shell cases are prone to tearing and deformation.

Conventional protective cases are made of plastic, metal, leather or transparent acrylic. While conventional cases provide protection, they suffer from certain inherent shortcomings. The plastic and leather protective cases are too soft to protect the mobile device from impact. The metal and the acrylic protective cases are made of rigid material which can scratch the surface of the mobile device and are difficult to assemble to, or remove from, the mobile device. Moreover, many conventional protective cases require removing the mobile device when it is being used or when it needs to be connected to an auxiliary device. The removal of the mobile device from the protective case is both cumbersome and risky. Finally, conventional protective cases are bulky.

Accordingly, there is a need for protective cases which protect the mobile device from scratching and accidental damage while providing ease of access to the mobile device.

SUMMARY

In one embodiment, the disclosure relates to a protection device for a mobile device (e.g., a personal digital assistant ("PDA")). The protection device includes a flexible inner sleeve for conformingly surrounding the mobile device, the flexible inner sleeve having a screen aperture and a plurality of indents, the flexible inner sleeve receiving the mobile device through the screen aperture, and a rigid shell for engaging the flexible inner sleeve, the rigid shell having a plurality of fingers where each finger engages a corresponding indent on the flexible inner sleeve.

In another embodiment, the protection device includes a flexible inner sleeve and a rigid shell. The flexible inner sleeve conformingly encapsulates the mobile device. The flexible inner sleeve includes a screen aperture and at least one protrusion for manipulating a mobile device control or knob. The flexible inner sleeve receives the mobile device through the screen aperture and aligns each of its plurality of secondary apertures with a respective mobile device connection port to allow connecting the mobile device to an auxiliary device. The rigid shell receives the flexible inner sleeve and the mobile device to form an integrated protective case. The rigid shell also includes a plurality of apertures which align with the secondary apertures of the inner sleeve. A user can use the inner sleeve or the rigid shell to protect the PDA. Alternatively, a user can combine the inner sleeve and the rigid shell to provide an integrated protective unit for the mobile device.

In another embodiment, the disclosure relates to a protective case for receiving a mobile device. The protective sleeve includes a sheath having a backing and a plurality of edges, a sleeve having a face portion and a backing portion, the sleeve defining a first protrusion and a second protrusion which respectively correspond to a first control and a second control of the mobile device, wherein the sheath engagingly receives the sleeve between the plurality of edges and wherein the sheath includes a first cavity and a second cavity for receiving the first protrusion and the second protrusion, respectively.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Figure 1:
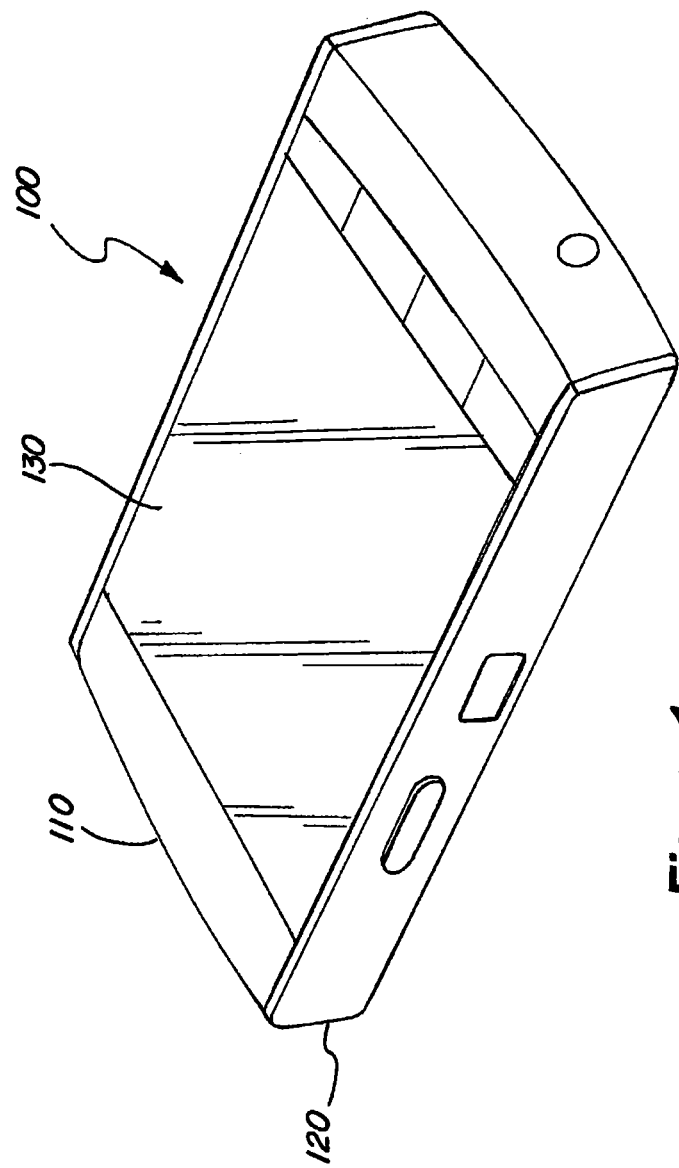
FIG. 1 is a perspective view of a conventional mobile device.

FIG. 1 is a perspective view of a conventional mobile device 100. Mobile device 100 of FIG. 1 can define a cellular or WiFi phone, a smart phone, a PDA, a portable media player, a web browser or any other portable device. For brevity, such devices are identified generically as mobile devices.

Mobile device 100 is shown with a top surface 110 and a side surface 120. Display 130 is conventionally integrated into the mobile device 100 and defines a screen which can be a touchpad, a keyboard or a combination of both. Certain conventional mobile devices include touch-sensitive screens which can also act as a keyboard.

Figure 2A:
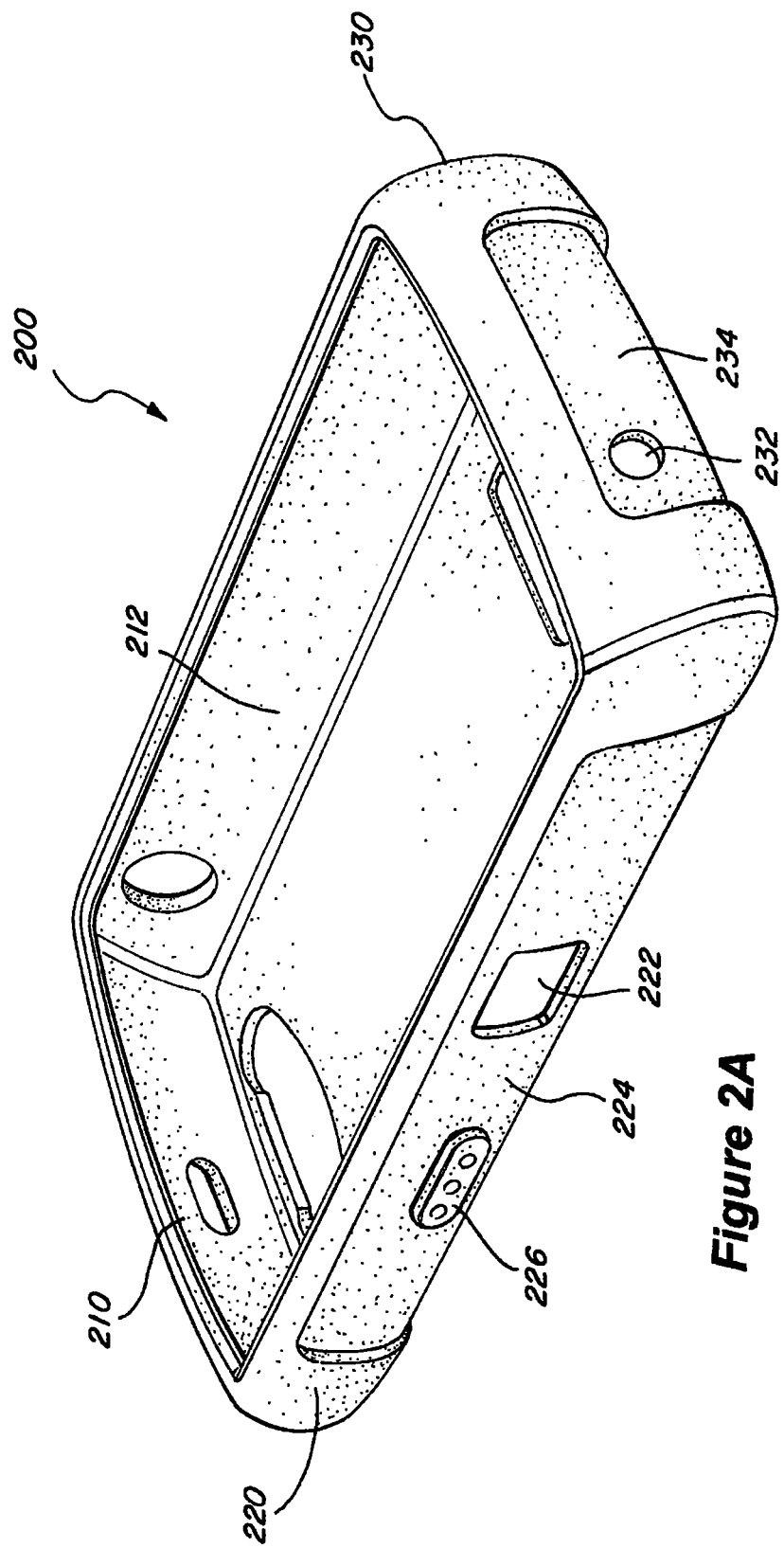
FIG. 2A is a perspective view of a flexible inner sleeve for surrounding a mobile device according to an embodiment of the invention.

FIG. 2A is a perspective view of a flexible inner sleeve 200 for surrounding a mobile device 100 according to an embodiment of the invention. Flexible inner sleeve 200 can be molded to have the same shape and configuration as the mobile device it protects. Flexible inner sleeve 200 can be formed from a polymeric or rubber material with suitable elasticity. In one embodiment, the polymeric material includes silicon-based polymer and/or rubber material. Flexible inner sleeve 200 can also be formed from a foam-type elastic material. The elasticity of the flexible inner sleeve 200 provides several functionalities. First, the elastic polymer is soft to touch and provides excellent grip. Second, it protects against accidental dropping or other damages to the underlying mobile device. Finally, the elasticity enables the flexible inner sleeve 200 to be stretched or slipped over the mobile device.

Referring again to FIG. 2A, the flexible inner sleeve 200 includes top surface 210 and side surfaces 220 and 230. Top surface 210 includes screen aperture or opening 212. In one embodiment, the screen aperture or opening 212 is large enough to provide an unobstructed access to and view of the display screen of the mobile device. This is particularly suitable for mobile devices with touch-sensitive displays. The screen aperture or opening 212 can be configured to be large enough to expose the entire mobile device screen while small enough to cover the remaining portions of the mobile device. The top surface 210 forms an edge around the entire screen aperture or opening 212 to hold the mobile device within the flexible inner sleeve 200.

Side surface 220 includes side edge 224. As will be discussed below, side edge 224 can be indented to releasably engage a rigid shell. In one embodiment, side edge 224 defines a mortise which can lockingly engage an edge of a rigid shell. In another embodiment, edge 224 includes a groove for receiving and engaging a notch formed on the rigid shell. Side surface 220 also includes aperture 222 and protrusion 226. Aperture 222 can be formed on inner sleeve 200 to match and align with a port or an opening in the mobile device. The mobile device port typically defines a bus or a connection jack for connecting the mobile device to an auxiliary device.

Mortise 234 is formed on side surface 230 to engageably receive a rigid shell. In one embodiment, mortise 234 defines a depression or indent on the side surface 230 of inner sleeve 200. Aperture 232 is also formed on the side surface 230 of the inner sleeve 200 to align with a port or an opening in the mobile device. The port can be configured to receive, for example, a USB data connection or a headphone. The other sides (not shown) of inner sleeve 200 can have similar mortises, protrusions and apertures formed thereon. Depending on the configuration of the underlying mobile device, mortises can be formed on all four sides of the inner sleeve 200 or on one, two or three sides thereof. In one embodiment, where mortises are formed on two opposing sides of the flexible inner sleeve 200, the rigid shell can releasably engage two sides of the flexible inner sleeve 200. The limited elasticity of the rigid shell and the elasticity of the flexible inner sleeve 200 allow coupling of the flexible inner sleeve 200 to the rigid shell 250.

Figure 2B:
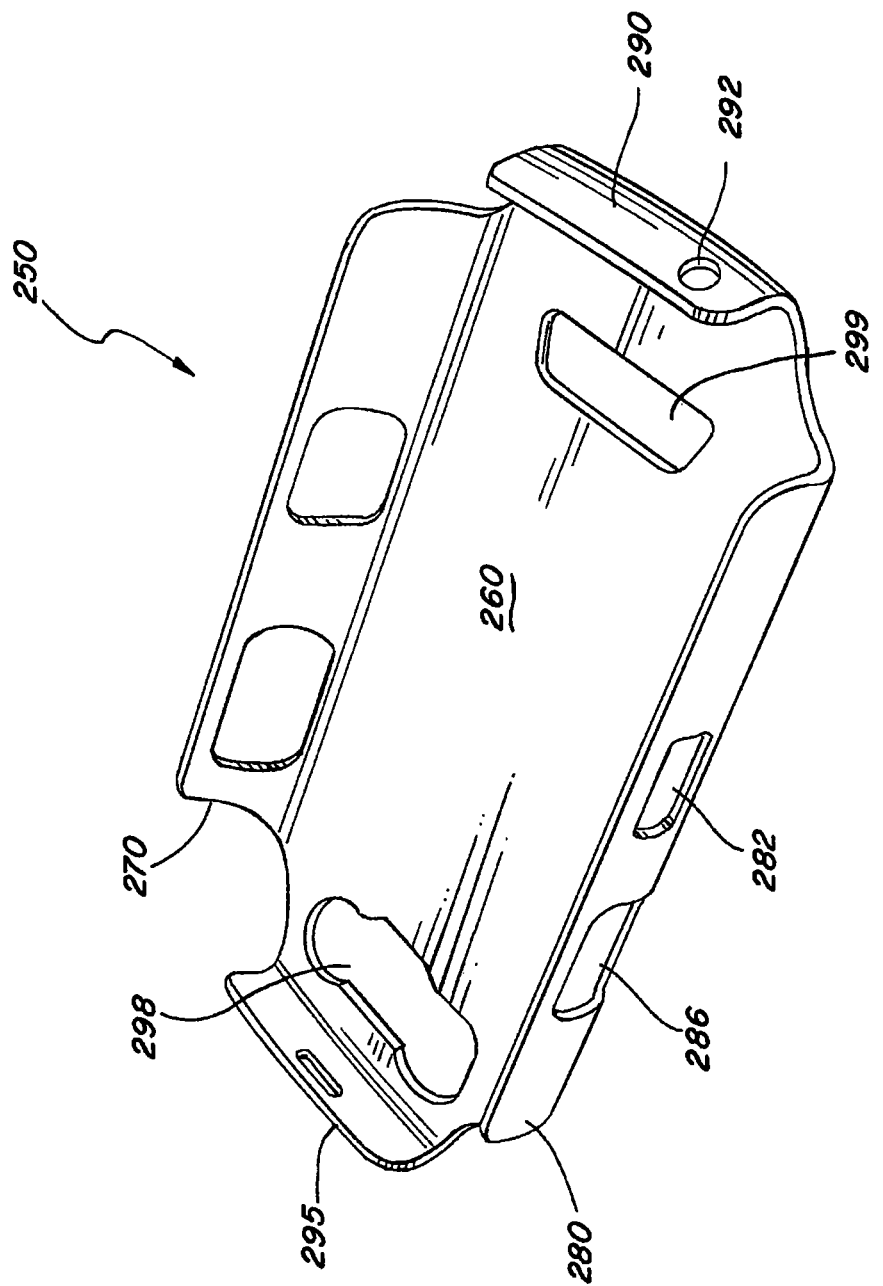
FIG. 2B is a perspective view of a rigid shell for use with the flexible inner sleeve of FIG. 2A according to an embodiment of the invention.

FIG. 2B is a perspective view of a rigid shell 250 for use with the flexible inner sleeve 200 of FIG. 2A according to an embodiment of the invention. The rigid shell 250 includes a bottom surface 260 and side surfaces (interchangeably, side edges) 270, 280, 290 and 295. Side surfaces 270 and 280 engage opposing sides of the flexible inner sleeve 200 (see FIG. 2A). Similarly, side surfaces 290 and 295 engage opposing sides of the flexible inner sleeve 200. In this manner, the side surfaces function to secure the rigid shell 250 to the flexible inner sleeve 200. The side surfaces 270, 280, 290 and 295 of the rigid shell 250 can have corner openings at the four corners to expose the flexible inner sleeve 200.

Side surface 280 includes apertures 282 and 286, which correspond to aperture 222 and protrusion 226 of the flexible inner sleeve 200 (see also FIG. 2A). Aperture 286 receives protrusion 226, allowing the user to manipulate the underlying mobile device. Similarly, when the flexible inner sleeve 200 of FIG. 2A is engaged with the rigid shell 250 of FIG. 2B, the apertures 222 and 282 are aligned to provide access to a mobile device port (not shown). The alignment in the two apertures 222 and 282 allows the mobile device port to be exposed outside of the protective device and to be connected to an auxiliary device (e.g., a computer). In one embodiment, the apertures 222 and 282 align to form a cavity for a mobile device to protrude therefrom. Thus, the user can engage the dial without having to remove one or both of the protective devices.

Side surfaces 290 and 295 can be optionally added to grip opposing sides of the flexible inner sleeve 200. Side surface 290 includes an aperture 292 which aligns with aperture 232 of FIG. 2A. The apertures 232 and 292 may be used for a camera lens in the mobile device. When the flexible inner sleeve 200 of FIG. 2A is aligned with the rigid shell 250 of FIG. 2B, the apertures 232 and 292 provide access to the mobile device port. The hard shell 250 and the flexible inner sleeve 200 can be configured to follow the contours of the underlying mobile device. In one embodiment, the flexible inner sleeve 200 follows the contours of the mobile device and the hard shell 250 follows the contours of the flexible inner sleeve 200. When assembled, the two-part protection system (i.e., the hard shell and the flexible inner sleeve) does not add substantially to the overall size and weight of the device.

Aperture 298 can be optionally added to receive a bracket for connecting rigid shell 250 to an outside mount. Aperture 298 can be replaced by a clip or any other suitable mounting apparatus which allows attaching the mobile device to a person's belt or pockets. While not shown, the flexible inner sleeve may also include similar configuration for attaching directly to the clothing. Aperture 299 can be used to mate with a corresponding protrusion on flexible inner sleeve 200 to allow for better securement and releasing of the two parts.

While FIGS. 2A and 2B show four surfaces for engaging hard shell 250 to flexible inner sleeve 200, the inventive principles are not limited thereto. In one embodiment, the hard shell 250 can be configured to engage the flexible inner sleeve 200 at two or more of its sides or corners. In another embodiment, the hard shell 250 can be configured to engage the flexible inner sleeve 200 at only two edges. In still another embodiment, the hard shell can be designed to slidingly receive the flexible inner sleeve by forming a tongue-and-grove feature with the inner sleeve. In yet another embodiment, the flexible inner sleeve can be snapped into place using one or more coupling points with the rigid shell.

Figure 3A:
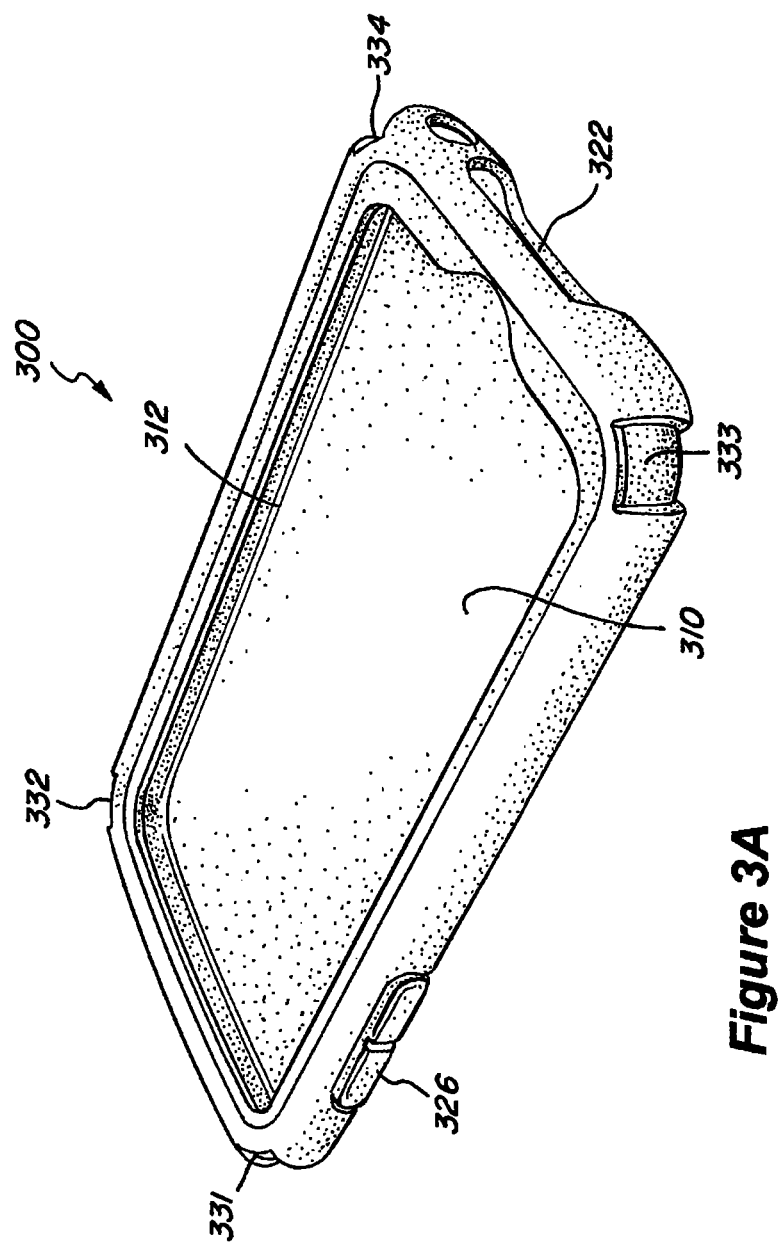
FIG. 3A is a top perspective view of a flexible inner sleeve for surrounding a mobile device.

FIG. 3A is a perspective view of a prior art flexible inner sleeve 300 for surrounding a mobile device 312. The flexible inner sleeve 300 is designed to conform to the contours of the mobile device 312 (e.g., an iPhone®). The mobile device 312 includes display and keyboard sections on the face thereof. The flexible inner sleeve 300 is made of a soft-touch silicon lining to protect the mobile device 312 from shocks or other static electricity. The flexible inner sleeve 300 includes apertures 310 and 322. Aperture 310 receives the mobile device 312. Aperture 322 provides an opening for accessing a mobile device port. Protrusion 326 is positioned over a mobile device control, such as volume control. Protrusion 326 allows the user to effect a change in the mobile device by pressing the protrusion. The change can be, for example, increasing or decreasing the volume of the mobile device. Protrusion 326 has two parts corresponding to one of mobile device volume increase or decrease. The flexible inner sleeve 300 includes four indents 331, 332, 333 and 334 at its four corners. The four indents 331, 332, 333 and 334 mate with the four fingers 351, 352, 353 and 354, respectively, on the hard shell 350 to protect the four corners from accidental dropping of the mobile device 312.

Figure 3B:
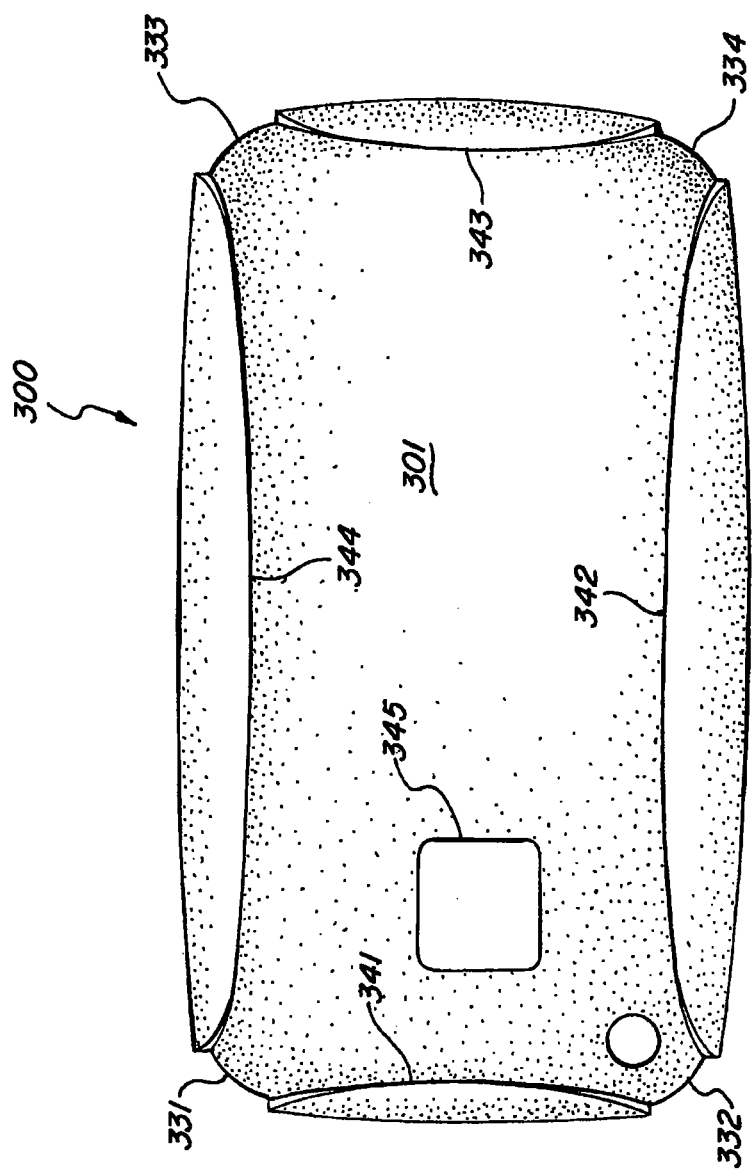
FIG. 3B is a bottom plan view of the flexible inner sleeve of FIG. 3A for surrounding a mobile device.

FIG. 3B is a bottom plan view of the flexible inner sleeve 300 of FIG. 3A for surrounding a mobile device. The flexible inner sleeve 300 includes a bottom surface 301 that mates with an inner surface 302 of a rigid shell 350 (see also FIG. 3C). Four outer convex raised portions 341, 342, 343 and 344 surround the bottom surface 301. The outer convex raised portions 342 and 344 allow the user to grab the soft flexible inner sleeve 300 while still providing the hard protection of the rigid shell 350. The flexible inner sleeve 300 includes a center raised portion 345 to snugly mate with an opening 370 on the rigid shell 350 to provide a better connection between the flexible inner sleeve 300 and the rigid shell 350.

Figure 3C:
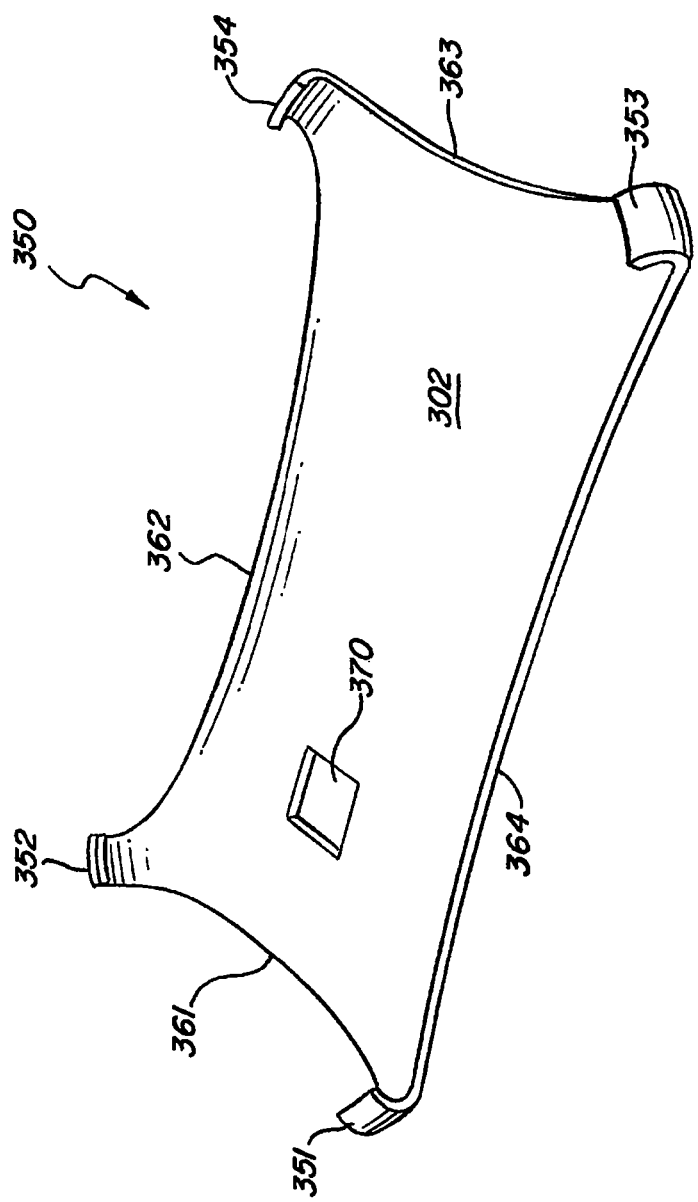
FIG. 3C is a perspective inside view of a rigid shell for use with the flexible inner sleeve of FIGS. 3A and 3B.

FIG. 3C is a perspective view of a prior art rigid shell 350 for use with the flexible inner sleeve 300 of FIGS. 3A and 3B. The rigid shell 350 is a hard or rigid acrylic shell that engages the mobile device 312 through the flexible inner sleeve 300. The rigid shell 350 includes four fingers 351, 352, 353 and 354 to grab, attach to or fit into the four indents 331, 332, 333 and 334 of the flexible inner sleeve 300 of FIGS. 3A and 3B. The four fingers 351, 352, 353 and 354 provide protection to the four corners of the mobile device. The rigid shell 350 also has four concave sides 361, 362, 363 and 364 to snugly fit against the corresponding outer convex raised portions 341, 342, 343 and 344, respectively, when attached to the flexible inner sleeve 300. The rigid shell 350 does not cover the sides (i.e., the four outer convex raised portions 341, 342, 343 and 344) but does cover the bottom surface 301 of the flexible inner sleeve 300. Exposing the four outer convex raised portions 341, 342, 343 and 344 of the flexible inner sleeve 300 allows the user to have a better grip while still providing the rigid shell 350 to protect the mobile device 312.

Figure 4:
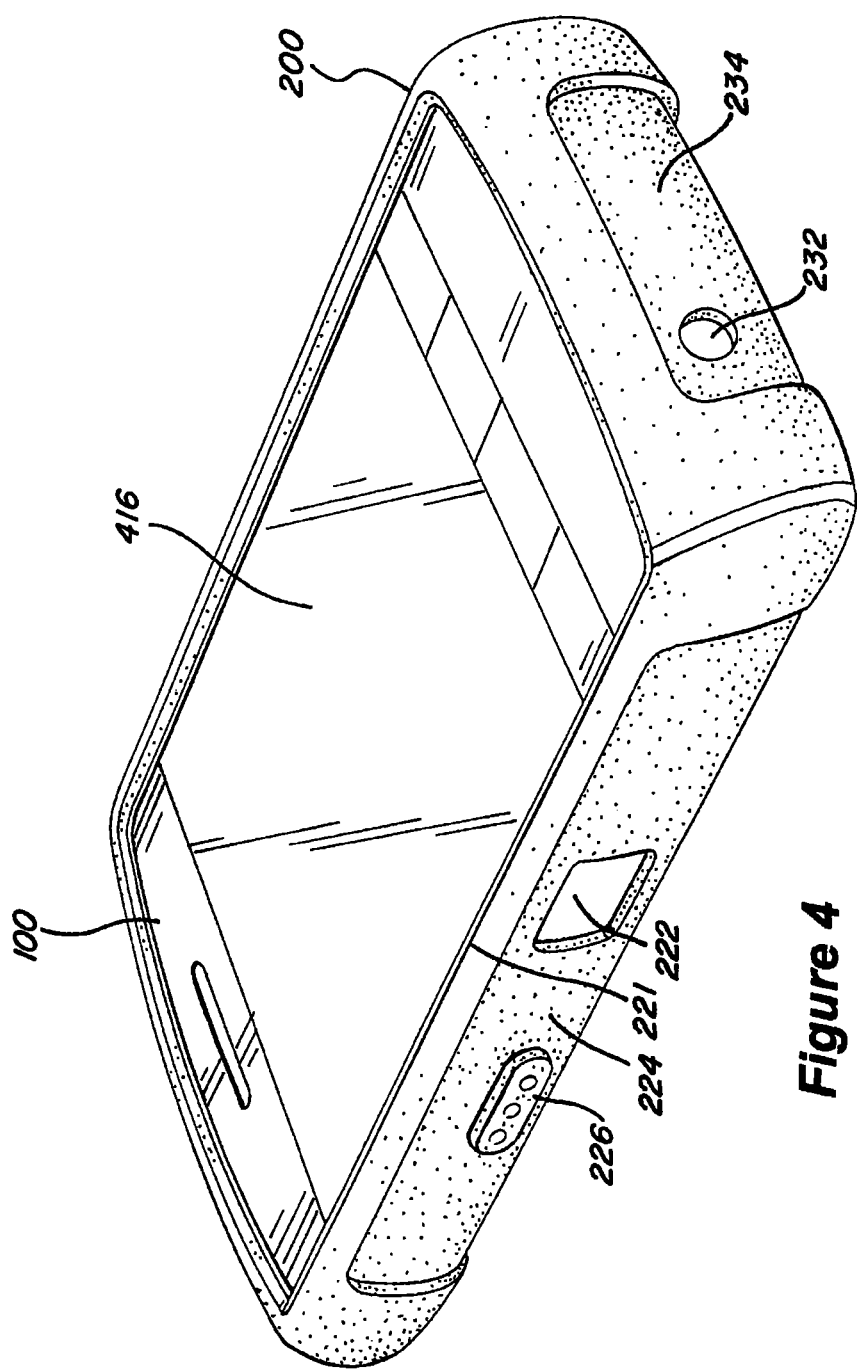
FIG. 4 is a perspective view of a mobile device enclosed in the flexible inner sleeve of FIG. 2A according to an embodiment of the invention.

FIG. 4 is a perspective view of a mobile device 100 enclosed in the flexible inner sleeve 200 of FIG. 2A according to an embodiment of the invention. In FIG. 4, the mobile device 100 is inserted inside the flexible inner sleeve 200 through the screen aperture 212. Protrusion 226 aligns with a control knob (not shown) of the mobile device 100 and the aperture 222 provides an opening to access a mobile device port 414. It can be seen that a screen 416 of the mobile device 100 is readily accessible by the user.

Figure 5:
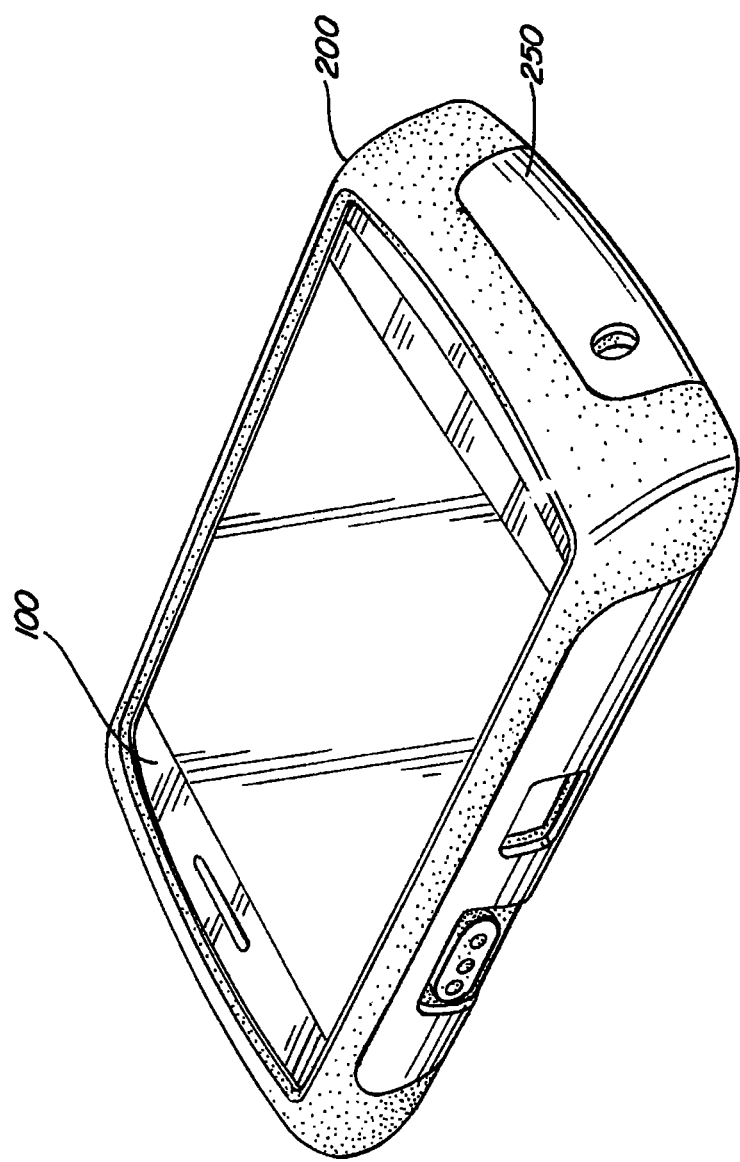
FIG. 5 is a perspective view of a mobile device enclosed in the flexible inner sleeve of FIG. 2A and the rigid shell of FIG. 2B according to an embodiment of the invention.

FIG. 5 is a perspective view of a mobile device 100 enclosed in the flexible inner sleeve 200 of FIG. 2A and the rigid shell 250 of FIG. 2B according to an embodiment of the invention. Specifically, FIG. 5 shows the flexible inner sleeve 200 containing the mobile device 100. The combination of the flexible inner sleeve 200 and the rigid shell 250 protect the mobile device 100 while allowing immediate access to the buttons and screen of the mobile device 100. The flexible inner sleeve 200 is snugly fit around the mobile device 100 and the rigid shell 250 is snapped or attached to the flexible inner sleeve 200. The combination of the rigid shell 250 and the flexible inner sleeve 200 can be coupled to the user through a clip (not shown).

Figure 6:
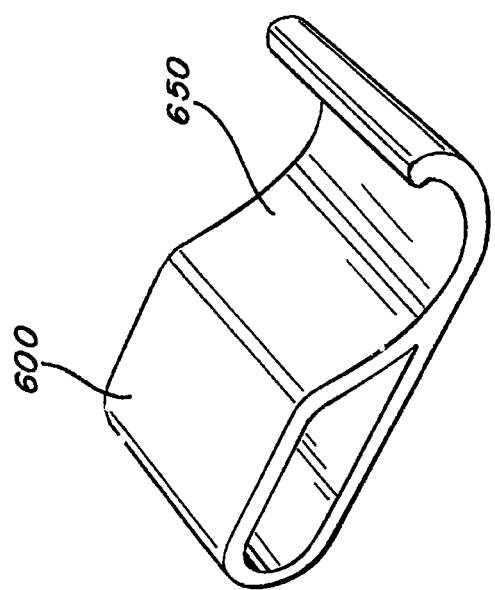
FIG. 6 shows a mounting bracket for use with an exemplary protective case.

FIG. 6 shows a prior art mounting bracket 600. The mounting bracket 600 has a curved portion 650 for receiving the mobile device 100.

FIG. 7 A is a top perspective view of a flexible inner sleeve 700 for surrounding a mobile device 712 according to an embodiment of the invention. The flexible inner sleeve 700 is designed to conform to the contours of the mobile device 712 (e.g., an iPhone®). The mobile device 712 includes display and keyboard sections on the face thereof. The flexible inner sleeve 700 can be made of a soft touch silicon rubber lining to protect the mobile device 712 from shocks or other static electricity. The flexible inner sleeve 700 includes apertures 710 and 722. Aperture 710 receives the mobile device 712. Aperture 722 provides an opening for accessing a mobile device port. Protrusion 726 is positioned over a mobile device control, such as volume control. Protrusion 726 allows the user to effect a change in the mobile device 712 by pressing the protrusion 726. The change can be, for example, increasing or decreasing the volume of the mobile device 712. In one embodiment, protrusion 726 is configured to have two parts corresponding to one of mobile device volume increase or decrease. The flexible inner sleeve 700 includes four indents 731, 732, 733 and 734 at its four corners. The four indents 731, 732, 733 and 734 mate with the four fingers 751, 752, 753 and 754, respectively, on the hard shell 750 to protect the four corners of the mobile device 712 from accidental dropping of the mobile device 712.

Figure 7A:
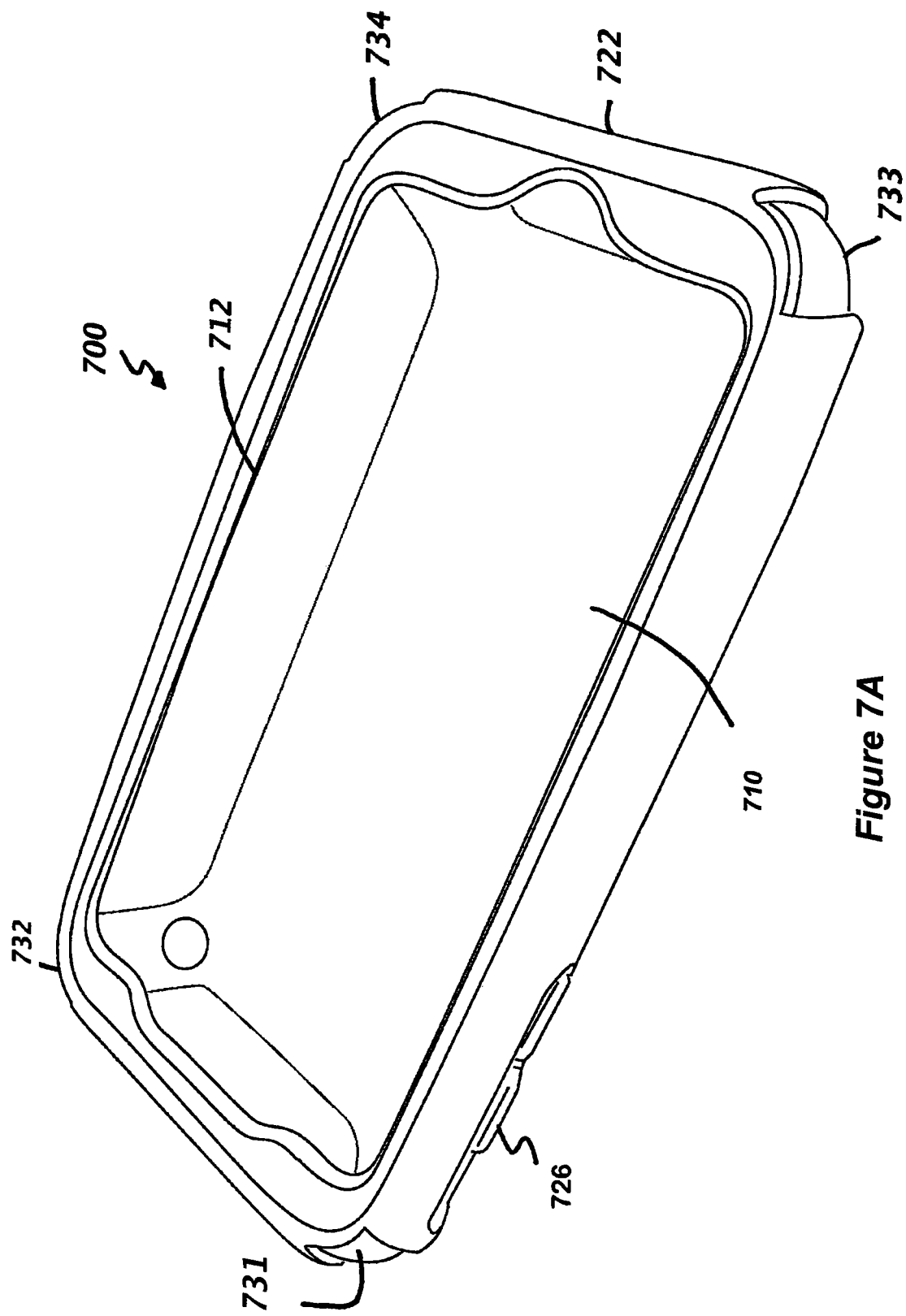
FIG. 7A is a top perspective view of a flexible inner sleeve for surrounding a mobile device according to an embodiment of the invention.
Figure 7B:
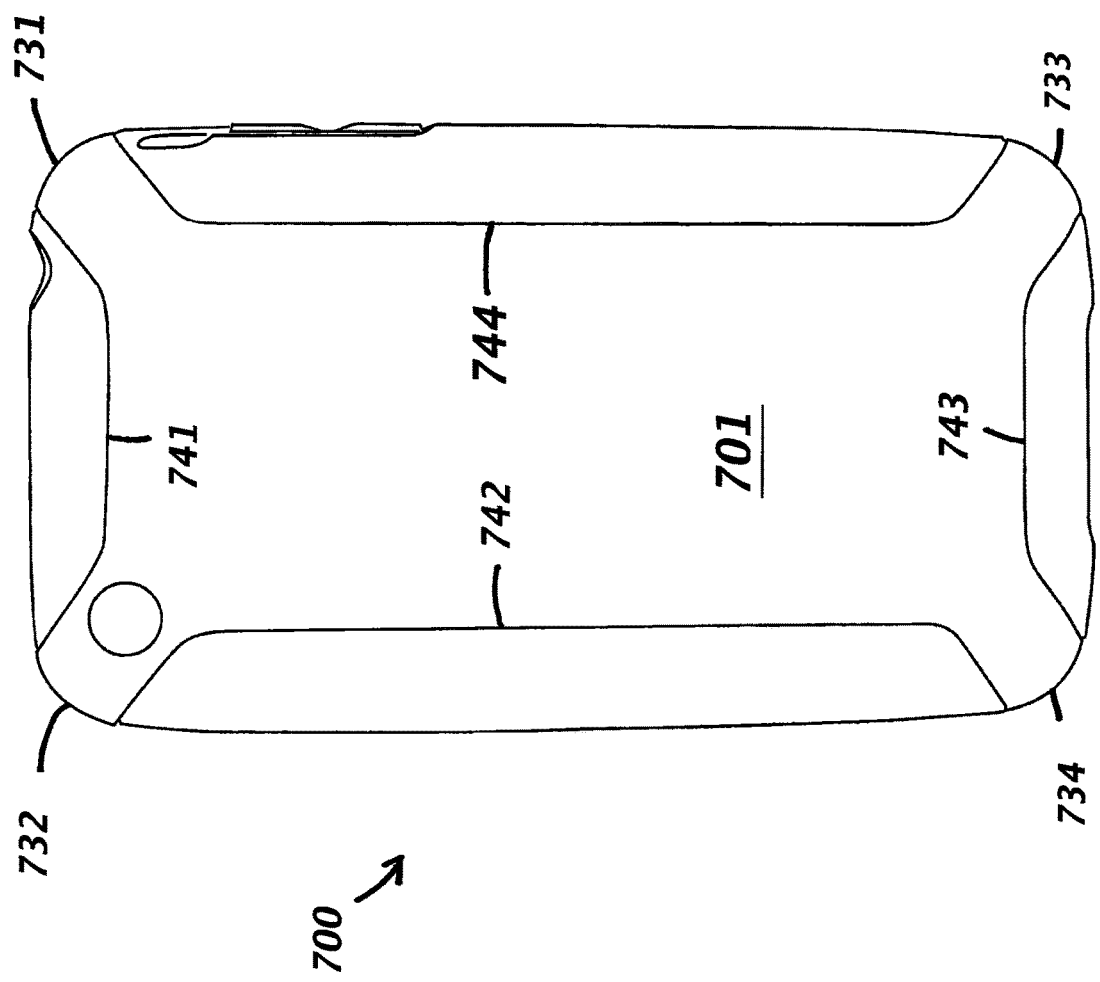
FIG. 7B is a bottom plan view of the flexible inner sleeve of FIG. 3A for surrounding a mobile device according to an embodiment of the invention.

FIG. 7B is a bottom plan view of the flexible inner sleeve 700 of FIG. 7A for surrounding a mobile device according to an embodiment of the invention. The flexible inner sleeve 700 includes a bottom 701 that mates with an inner surface 702 of a rigid shell 750 (see also FIG. 7C). Four outer raised portions 741, 742, 743 and 744 surround the bottom surface 701. The outer raised portions 742 and 744 allow the user to grab the soft flexible inner sleeve 700 while still providing the hard protection of the rigid shell 750.

Figure 7C:
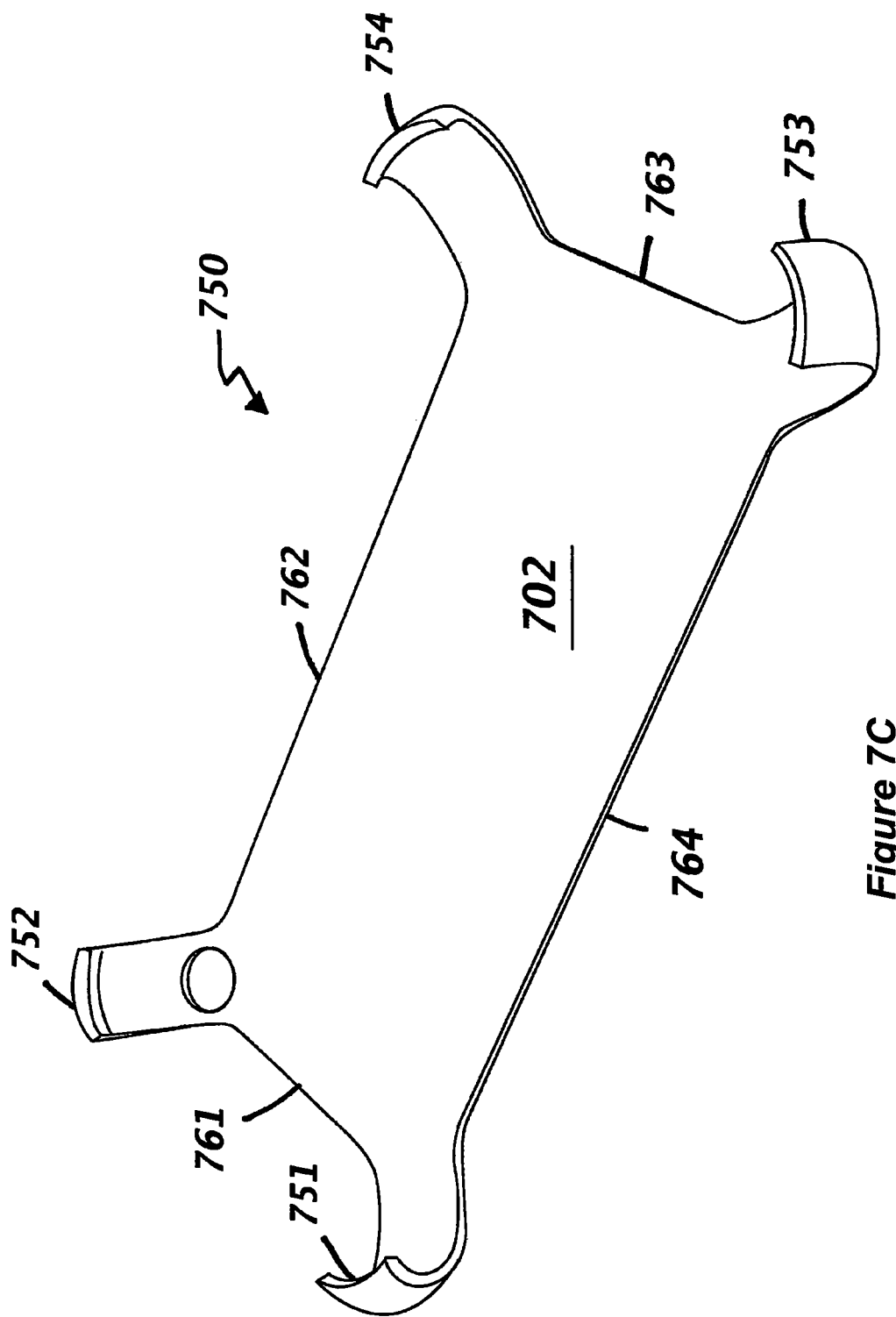
FIG. 7C is a perspective inside view of a rigid shell for use with the flexible inner sleeve of FIGS. 7A and 7B according to an embodiment of the invention.

FIG. 7C is a perspective view of a rigid shell 750 for use with the flexible inner sleeve 700 of FIGS. 7A and 7B according to an embodiment of the invention. The rigid shell 750 can be a hard or rigid acrylic shell configured to engage the mobile device 712 directly or through the flexible inner sleeve 700. The rigid shell 750 includes four fingers 751, 752, 753 and 754 to grab, attach to or fit into the four indents 731, 732, 733 and 734 of the flexible inner sleeve 700 of FIGS. 7A and 7B. The four fingers 751, 752, 753 and 754 provide protection to the four corners of the mobile device. The rigid shell 750 also has four sides 761, 762, 763 and 764 to snugly fit against the corresponding outer raised portions 741, 742, 743 and 744, respectively, when attached to the flexible inner sleeve 700. In one embodiment, the rigid shell 750 does not cover the sides (i.e., the four convex raised portions 741, 742, 743 and 744) but does cover the bottom surface 701 of the flexible inner sleeve 700. Exposing the four outer raised portions 741, 742, 743 and 744 of the flexible inner sleeve 700 allows the user to have a better grip while still providing the rigid shell 750 to protect the mobile device 712.

Figure 8:
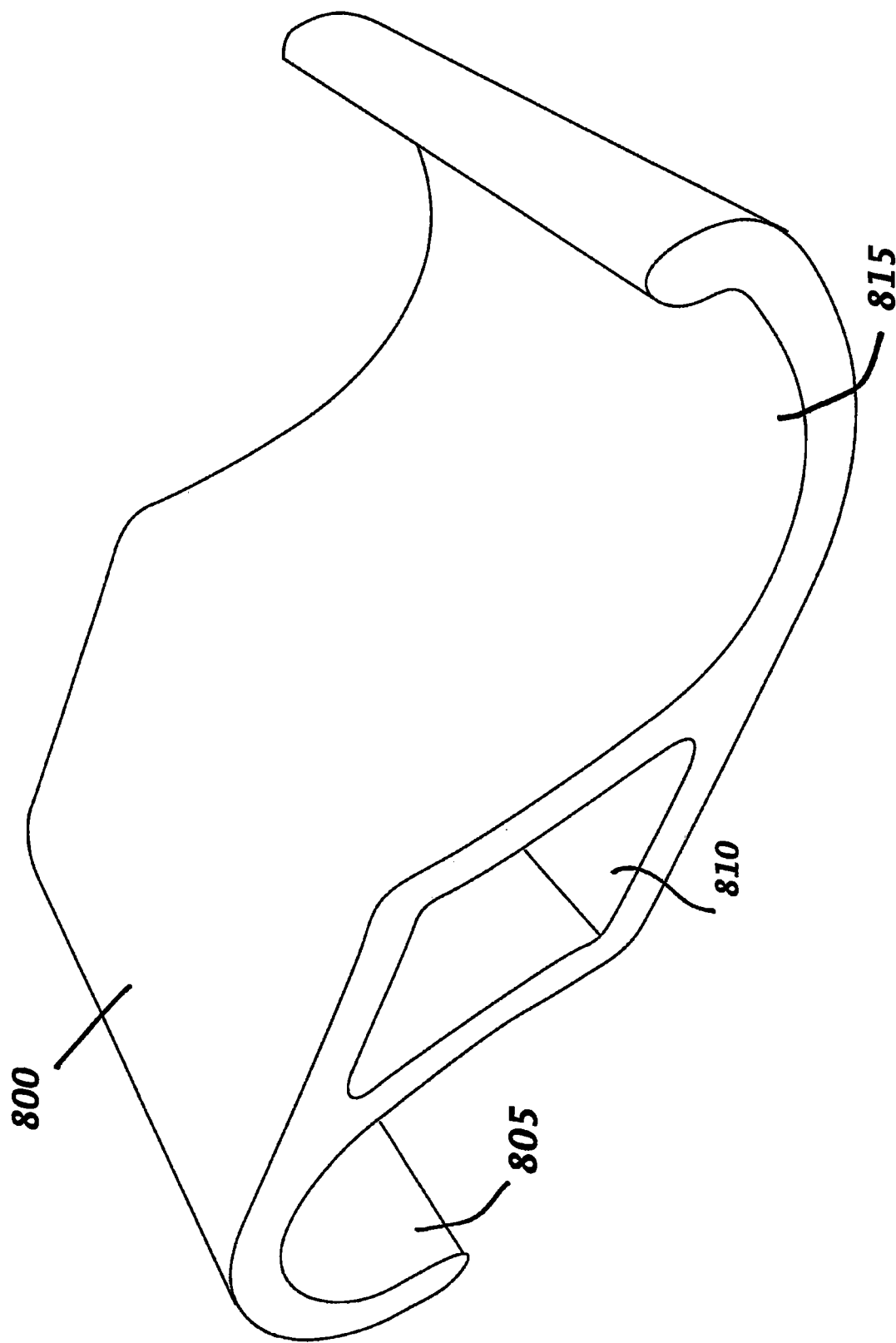
FIG. 8 shows a mounting bracket for use with an exemplary protective case according to an embodiment of the invention.

FIG. 8 shows a mounting bracket 800 for use with an exemplary protective case according to an embodiment of the invention. The mounting bracket 800 is formed in the shape of a "Z" and can have a curved portion 815 for receiving the mobile device 100. The mounting bracket 800 has a similar curved portion 805 on the other side. In one embodiment, the mounting bracket 800 has an opening 810 positioned between the two curved portions 805 and 815.

Figure 9:
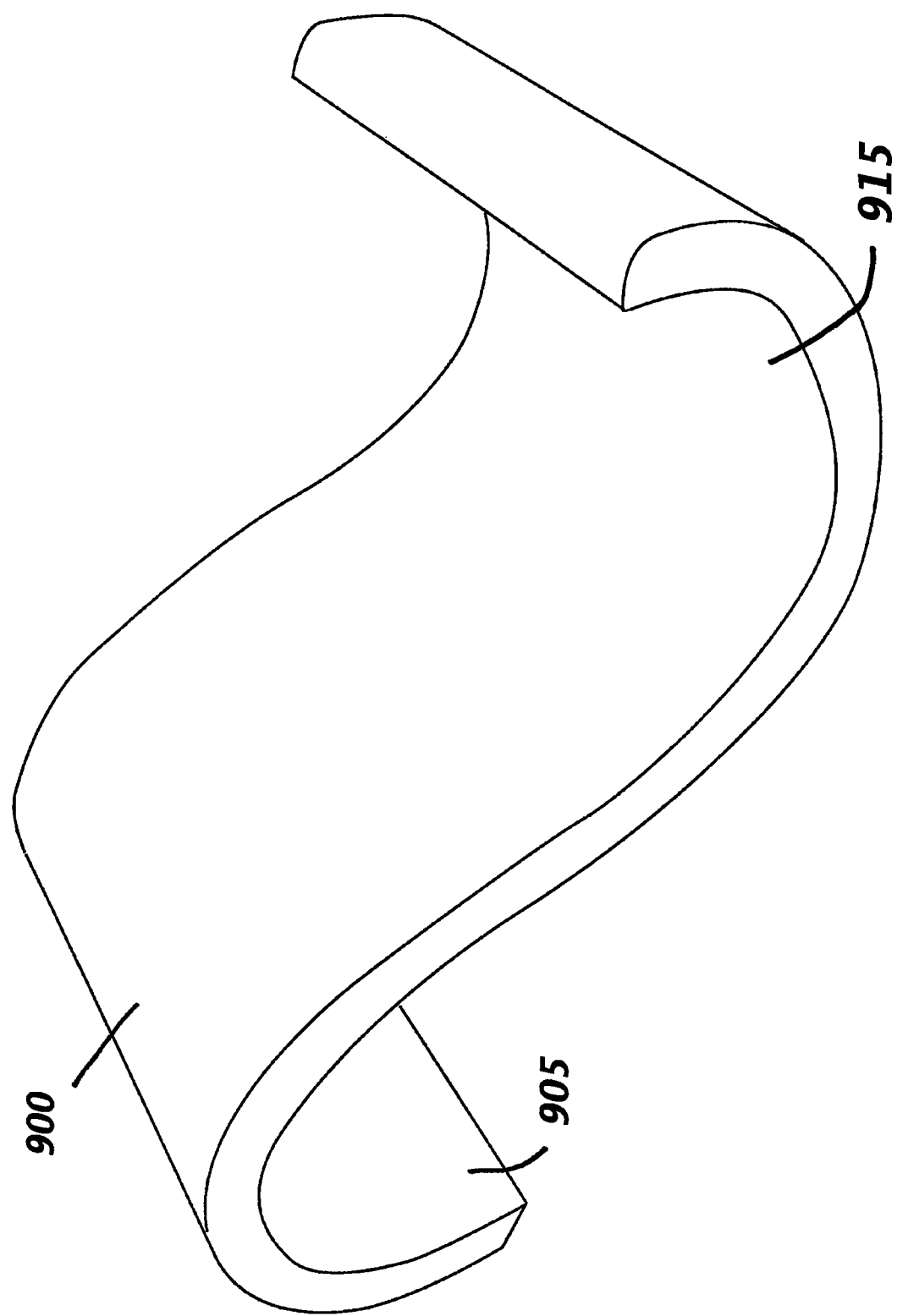
FIG. 9 shows a mounting bracket for use with an exemplary protective case according to an embodiment of the invention.

FIG. 9 shows a mounting bracket 900 for use with an exemplary protective case according to an embodiment of the invention. The mounting bracket 900 is formed in the shape of an "S" and can have a curved portion 915 for receiving the mobile device 100. The mounting bracket 900 has a similar curved portion 905 on the other side.

The invention has been disclosed in an illustrative manner. Accordingly, the terminology employed throughout should be read in an exemplary rather than a limiting manner. Although minor modifications of the invention will occur to those of ordinary skill in the art, it shall be understood that what is intended to be circumscribed within the scope of the patent warranted hereon are all such embodiments that reasonably fall within the scope of the advancement to the art hereby contributed, and that scope shall not be restricted, except in light of the appended claims and their equivalents.

What is claimed is:

1. A protective case for a mobile device configured to be in contact with all sides of a mobile device, the mobile device having a flat front surface, a flat back surface, and side surfaces extending between the front and back surfaces, the protective case comprising:
    a flexible inner sleeve configured to engage and surround a mobile device, including the back surface and the side surfaces of the mobile device, the flexible inner sleeve comprising a front surface, a back surface, and side surfaces extending between the front and back surfaces, including a top side, a bottom side, a right side, and a left side, the flexible inner sleeve further comprising an indention extending continuously from the back surface to the top, bottom, right, and left sides of the flexible inner sleeve, wherein the height of said indention on at least one of the top, bottom, right, and left sides of the flexible inner sleeve, as measured between the front and back surfaces, is less than the height of the indention extending on one or more of the other sides of the flexible inner sleeve, and wherein the flexible inner sleeve further includes a protrusion configured to overlie in contact with a control button on the mobile device; and
    a rigid outer shell releasably engaged with the flexible inner sleeve to thereby form an integrated protective unit, wherein the outer shell is configured to reside within the indention, wherein the outer shell includes an aperture dimensioned to receive the protrusion, wherein the outer shell includes multiple side walls that are configured to reside within the corresponding portions of the indention that are located on the side surfaces of the inner sleeve, and wherein at least one side wall of the outer shell is configured to reside entirely below the front surface of the mobile device when the mobile device is fully inserted within the protective case such that the back surface of the mobile device is in contact with the flat back surface of the flexible inner sleeve.

2. The protective case of claim 1, wherein when the outer shell is engaged with the flexible inner sleeve the case has an exposed edge of the flexible inner sleeve extending beyond the outer shell that surrounds and thereby defines a screen opening.

3. The protective case of claim 1, wherein the flexible inner sleeve comprises a soft polymeric material.

4. The protective case of claim 3, wherein the soft polymeric material is selected from the group consisting of a silicon-based polymer, a foamed polymer, or rubber.

5. The protective case of claim 1, wherein the outer shell comprises a hard plastic material.

6. The protective case of claim 5, wherein the hard plastic material comprises acrylic.

7. The protective case of claim 1, wherein when the outer shell is engaged with the flexible inner sleeve, the case has an exposed edge of the flexible inner sleeve not covered by the outer shell that surrounds and thereby defines the aperture.

8. The protective case of claim 7, wherein the second exposed edge includes a curved region.

9. The protective case of claim 1, wherein each of the top, bottom, right, and left sides of the flexible inner sleeve includes one or more apertures, and wherein the outer shell also includes one or more apertures that correspond to the one or more apertures of the top, bottom, right, and left sides of the flexible element.

10. The protective case of claim 1, wherein the flexible inner sleeve is configured to be removable from the outer shell.

* * * * *